(12) United States Patent
Jin et al.

(45) Date of Patent: Mar. 22, 2005
(10) Patent No.: US 6,869,007 B2

(54) OXIDATION-RESISTANT REACTIVE SOLDERS AND BRAZES

(75) Inventors: Sungho Jin, Millington, NJ (US); Hareesh Mavoori, Piscataway, NJ (US); Ainissa G Ramirez, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 552 days.

(21) Appl. No.: 10/046,836

(22) Filed: Jan. 15, 2002

(65) Prior Publication Data

US 2002/0106528 A1 Aug. 8, 2002

Related U.S. Application Data

(60) Provisional application No. 60/264,625, filed on Jan. 26, 2001.

(51) Int. Cl.[7] .................. B23K 35/14; H01L 21/461
(52) U.S. Cl. ............ 228/56.3; 438/659; 205/492.21
(58) Field of Search ................ 228/56.3, 245, 228/246; 205/432 R, 492.2, 492.21; 216/62, 87; 438/370, 373, 480, 506, 659

(56) References Cited

U.S. PATENT DOCUMENTS

| | | | |
|---|---|---|---|
| 3,949,118 A | 4/1976 | Nagano et al. ............... 427/57 |
| 5,013,612 A | 5/1991 | Hunt et al. ................. 428/552 |
| 5,139,704 A | 8/1992 | Holland et al. ............. 252/521 |
| 5,248,079 A | * | 9/1993 | Li .......................... 228/121 |
| 5,308,578 A | 5/1994 | Wong .......................... 420/558 |
| 5,340,411 A | 8/1994 | Megerle et al. ............... 148/26 |
| 5,350,105 A | 9/1994 | Delalle et al. ............. 228/56.3 |
| 5,400,489 A | 3/1995 | Hegner et al. ............. 29/25.41 |
| 5,665,921 A | 9/1997 | Gerst et al. ................... 73/715 |
| 5,683,936 A | * | 11/1997 | Pande et al. .................. 216/20 |
| 5,874,175 A | * | 2/1999 | Li .............................. 428/457 |
| 5,953,623 A | 9/1999 | Boyko et al. ............... 438/612 |
| 6,015,083 A | 1/2000 | Hayes et al. ................ 228/254 |
| 6,047,876 A | 4/2000 | Smith ....................... 228/111.5 |
| 6,054,693 A | 4/2000 | Barmatz et al. ............ 219/678 |
| 6,121,069 A | 9/2000 | Boyko et al. ............... 438/106 |
| 6,319,617 B1 | 11/2001 | Jin et al. .................... 428/469 |
| 6,579,623 B2 | * | 6/2003 | Kurihara et al. ............ 428/556 |
| 2002/0106528 A1 | * | 8/2002 | Jin et al. .................... 428/610 |
| 2004/0191558 A1 | * | 9/2004 | Ishikawa et al. ............ 428/615 |

FOREIGN PATENT DOCUMENTS

| | | | |
|---|---|---|---|
| DE | 003838968 A1 | * | 7/1989 |
| JP | 04050180 A | * | 2/1992 |
| JP | 404154679 A | * | 5/1992 |
| JP | 406239671 A | * | 8/1994 |
| JP | 408119759 A | * | 5/1996 |
| JP | 02003220493 A | * | 8/2003 |

OTHER PUBLICATIONS

Filas, Robert E., *Metallization Of Silica Optical Fibers*, Material Search Society Symposium Proceedings, vol. 531, (1998), pp. 263–272.

* cited by examiner

Primary Examiner—Kiley S. Stoner
(74) Attorney, Agent, or Firm—John D. McCabe

(57) ABSTRACT

A method for fabricating a reactive solder or braze includes forming a metallic matrix with an interior region and surface regions by actively providing a higher concentration of reactive atoms to the interior region than to the surface regions.

19 Claims, 4 Drawing Sheets

OXIDATION-RESISTANT REACTIVE SOLDERS AND BRAZES

The present application claims the benefit of U.S. Provisional Application No. 60/264,625, filed on Jan. 26, 2001.

BACKGROUND OF THE INVENTION

1. Field of the Invention

The invention relates to reactive solders and brazes.

2. Discussion of the Related Art

Solders and brazes include metallic compositions used to bond components, e.g., electrical or optical components. The metallic compositions have an elemental-metal or an alloy-metal matrix. The metallic matrices of solders have low melting temperatures, i.e., lower than about 450° C. The metallic matrices of brazes have higher melting temperatures than those of solders, and thus, form more thermally resistant bonds.

Metallic matrices of simple solders and brazes do not readily form chemical bonds with ceramic surfaces. Thus, soldering or brazing to such surfaces often results in low reliability bonds. For more reliable bonding to ceramics, reactive solders and brazes were developed. In reactive solders and brazes, reactive atoms are dispersed in the metallic matrix. The reactive atoms reduce ceramic and/or semiconductor surfaces so that atoms of such surfaces are able to chemically bond with the metallic matrix of the solder or braze.

In reactive solders and brazes, the reactive atoms are typically either group IIIB or IVB elements or rare earth elements. These elements have high affinities for elements found in ceramics, e.g., oxygen, carbon, nitrogen, or fluorine. Thus, the reactive elements reduce ceramic surfaces to form stable compounds. After being reduced, ceramic surfaces more readily form chemically bonds with the metallic matrix atoms of solders and brazes.

Unfortunately, the reactive elements used in solders and brazes easily oxidize and tend to cause oxide skins to form on the solders and brazes when heated or melted. The oxide skins prevent reactive solders and brazes from wetting surfaces to be bonded. The oxide skins also impede the diffusion of reactive atoms from the interiors of solders and brazes to the surfaces to be bonded. Thus, the formation of oxide skins interfere with the bonding of reactive solders and brazes.

An oxidation-resistant reactive solder or braze is a reactive solder or braze that has a lower concentration of reactive atoms at surfaces of the solder or braze's metallic matrix than in the interior region of the metallic matrix. The oxidation-resistant reactive solders and brazes have improved wetting and bonding properties, because the lower surface concentration of reactive atoms at surfaces reduces the tendency for such solders and brazes to form oxide-skins during initial stages of soldering or brazing. After such a solder or braze melts, the reactive atoms diffuse from the interior region to the surfaces of the solder or braze. Thus, the reactive atoms are available to reduce the surface to be bonding after initial stages of soldering and brazing.

It would be useful to have new or improved methods for producing oxidation-resistant reactive solders and brazes.

SUMMARY OF THE INVENTION

Methods are provided for fabricating oxidation-resistant reactive solders and brazes. The methods selectively incorporate more reactive atoms in interior regions of solders and brazes rather than chemically treating the solders and brazes to selectively remove reactive atoms from their surfaces. By eliminating chemical removal treatments, the methods herein are able to fabricate a wider class of oxidation-resistant reactive solders and brazes than methods based on such treatments. The elimination of chemical treatments also lowers risks of chemical-induced damage such as changes to alloy compositions at surfaces of the solders and brazes.

In one aspect, the invention features a method for fabricating a reactive solder or braze. The method includes forming a metallic matrix with an interior region and surface regions by actively providing a higher concentration of reactive atoms to the interior region than to the surface regions.

Some embodiments implant ions of the reactive atoms through a front surface of the metallic matrix to form a buried layer of reactive atoms in the interior region.

Other embodiments make the interior region from a solid metallic composition having reactive atoms dispersed therein and bond the surface regions to an exterior surface of the metallic composition.

In another aspect, the invention features solder and braze compositions that include a metallic matrix having first and second surface regions and first and second interior regions. The first and second interior regions are adjacent the respective first and second surface regions. The interior regions have higher concentrations of reactive atoms than the surface regions. The first and second interior regions have different reactive atom species.

In another aspect, the invention features solder and braze compositions that include a first matrix material of one metal and a second matrix material of a different metal. The second matrix material is bonded to the first matrix material. The first matrix material is located inside the second matrix material and has a higher concentration of reactive atoms than the second matrix material.

DETAILED DESCRIPTION OF THE EMBODIMENTS

Various embodiments provide methods for fabricating oxidation-resistant reactive solders and brazes. The methods actively incorporate higher concentrations of reactive atoms in interior regions of the solders and brazes than in surface regions of the solders and brazes.

Figure 1:
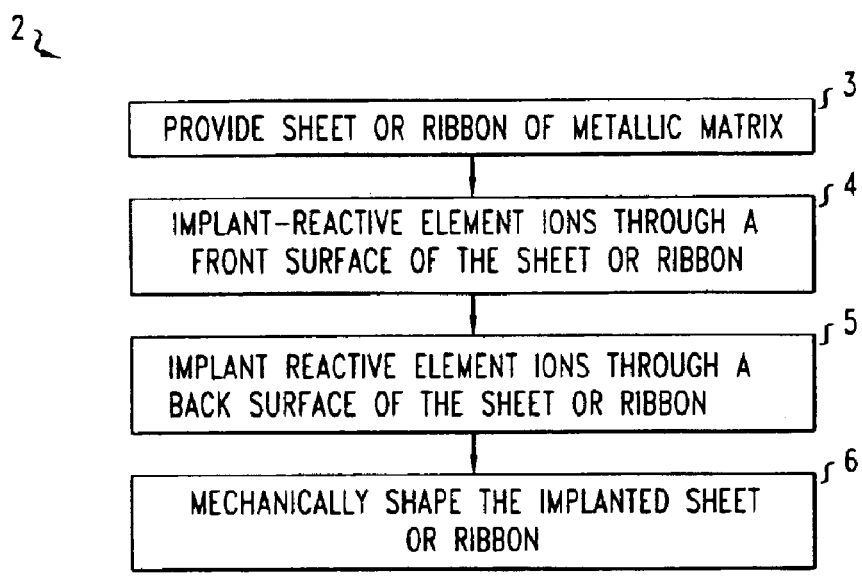
FIG. 1 is a flowchart for an implantation method for fabricating oxidation-resistant reactive solders and brazes.

FIGS. 1 is a flow chart for a fabrication method 2 based on particle implantation. The method 2 implants ions of one or more reactive elements through surfaces of the metallic matrix of the solder or braze to form buried layers of reactive atoms in the interior region. The various steps of the method 2 are also illustrated by FIGS. 2A–2D.

Figure 2A:
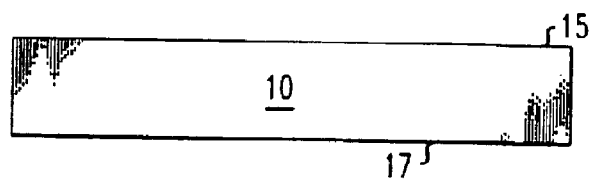
FIGS. 2A–2D illustrate steps of the method of FIG. 1.

Referring to FIG. 2A, fabrication method 2 includes providing a sheet or ribbon 10 of metallic matrix for the desired solder or braze (step 3). The metallic matrix is an elemental-metal or an alloy-metal in which reactive atoms are absent.

Figure 2B:
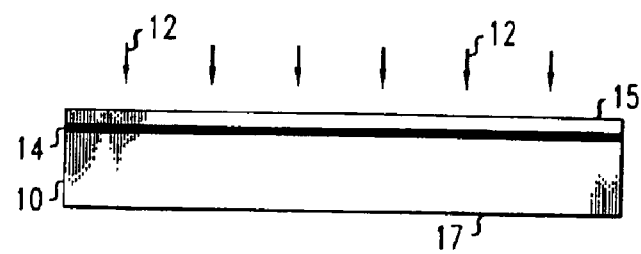

Referring to FIG. 2B, fabrication method 2 includes performing an active implant of one or more species of reactive element ions 12 into sheet or ribbon 10 of metallic matrix material (step 4). The implant produces a layer 14 at a selected distance from front surface 15. The layer 14 incorporates selected doses of the one or more implanted species of reactive elements. After the implant, the concentration of reactive atoms in the sheet or ribbon 10 is higher in an internal region of the sheet 10 than in regions adjacent the front surface 15, i.e., the concentration is highest in buried layer 14.

Figure 2C:
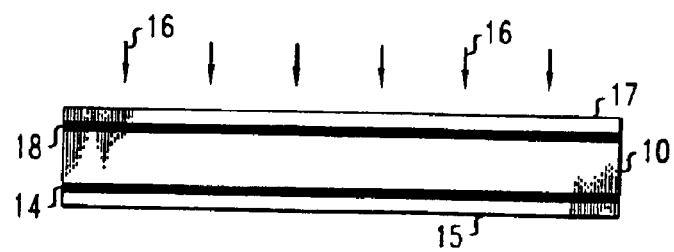

Referring to FIG. 2C, fabrication method 2 includes performing another active implant of one or more species of reactive element ions 16 through back surface 17 of the previously implanted sheet or ribbon 10 (step 5). This implant produces a second layer 18 at a distance from back surface 17 of sheet or ribbon 10. The second layer 18 includes selected doses of the one or more implanted species of reactive atoms used in this second implant. After this second implant, the concentration of reactive atoms in the sheet or ribbon 10 is higher in the second layer 18, which is in the interior of the sheet or ribbon 10, than at the back surface 17.

Figure 2D:
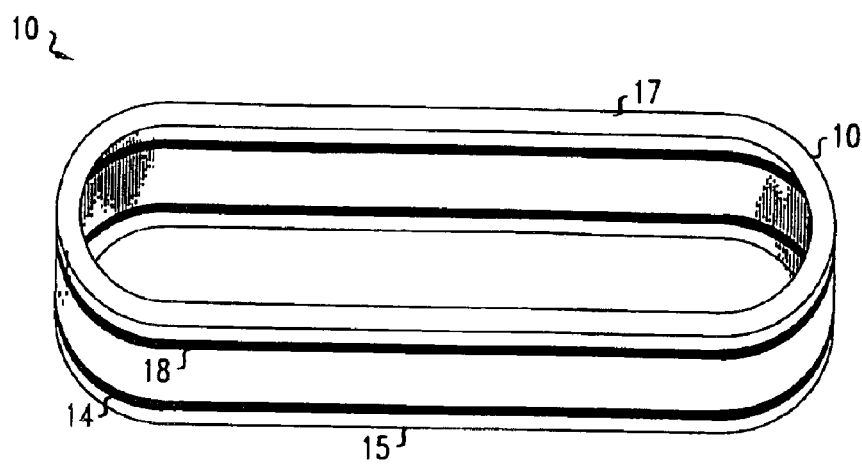

Referring to FIG. 2D, fabrication method 2 also includes mechanically shaping implanted sheet or ribbon 10 to have a desired geometry for the final oxidation-resistant reactive solder or braze (step 6). Exemplary shaping steps include shearing, punching, electric-discharge machining, or drilling the implanted sheet or ribbon 10.

In various embodiments, the selection of species of reactive ions, species doses, and depths of buried layers 14, 18 differ. The selection of the species depends on the substrate to be bonded and the metallic matrix of the reactive solder or braze. The selection of the doses and depths depends on the species, solubility and diffusivity of the species in the metallic matrix, and the substrate to be bonded. Implant doses are typically in the range of about $10^{14}$ to about $10^{17}$ reactive atoms per square centimeter. Both the dose and the duration of the implant determine the final implanted concentration of reactive atoms in the metallic matrix.

In various embodiments, steps 4, 5 implant the same or different species of reactive elements into sheet or ribbon 10. Implanting ions of different species of reactive elements 12, 16 through surface 15 and surface 17 produces solders and brazes that are designed for bonding different substrates. For example, one solder for bonding diamond to silicon is made by implanting rare earth ions through front surface 15 of the sheet or ribbon 10, i.e., step 4, and implanting titanium ions through the back surface 18 of the sheet or ribbon 10, i.e., step 5. The rare earth atoms aid to bond the surface 15 to diamond, and the titanium atoms aid to bond the surface 17 to silicon.

In various embodiments, the dose of implanted reactive ions is varied to produce solders and brazes with different bonding strengths. Some solders and brazes that are designed for only holding components together during assembly are made with weak doses of reactive element ions. These solders and brazes form bonds that break when stresses exceed a selected critical value, and such above-critical stresses are applied after assembly is done.

Some embodiments of method 2 use shadow-masks during implant steps 4 and 5 so that reactive ions are only implanted in selected areas of the solder or braze.

FIGS. 3–6 illustrate various methods that produce the interior regions of oxidation-resistant reactive solders and brazes from solid metallic compositions having reactive atoms dispersed therein. The methods bond surface regions of the final solders and brazes to exterior surfaces of the solid metallic composition.

Figure 3:
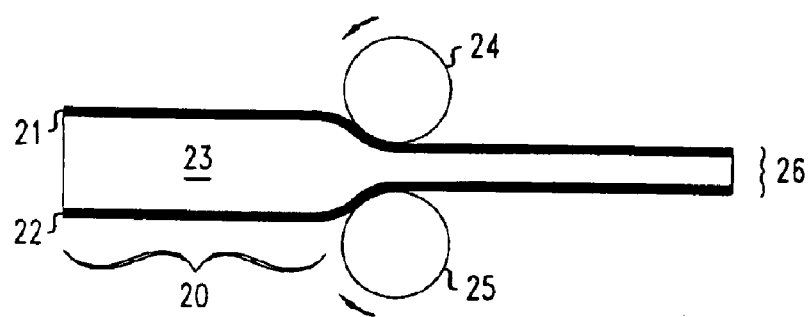
FIG. 3 illustrates a cold welding method for fabricating oxidation-resistant reactive solders and brazes.

FIG. 3 illustrates an alternate method for fabricating oxidation-resistant reactive solders and brazes. The method includes forming a stack 20 by positioning jacket layers 21, 22 around an inner layer 23. The inner layer 23 has an elemental metal or an alloy-metal matrix in which a selected uniform concentration of reactive atoms is dispersed. The jacket layers 21, 22 have the same metal matrix as the inner layer 23, but reactive atoms are absent from the matrices of the jacket layers 21, 22. Exemplary jacket layers 21, 22 have thicknesses of about 1.0 microns ($\mu$) to about 200 $\mu$ and preferably of about 5 $\mu$ to about 25 $\mu$.

The method also includes plastically deforming the stack 20 to cold weld the jacket and inner layers 21, 22, 23 together. Cold welding results from plastic deformations of the jacket layers 21, 22 and/or the inner layer 23. An exemplary embodiment rolls the stack 20 between rollers 24, 25 to produce the plastic deformations that cause the cold welding. The cold-welded stack 26 is the final oxidation-resistant solder or braze.

In some embodiments, inner layers 23 are reactive solders and brazes that have been formed by a rapid solidification process. The rapid solidification process super-cools the starting reactive solder or braze so that many nucleation points form. The nucleation points stimulate growth of inter-metallic-phase islands of reactive atoms in the metallic matrices of the solders and brazes. Exemplary processes cool molten reactive solders at rates of least 1000° C. per hour or more and preferably at rates of at least 6000° C. per hour to produce the super-cooling. The super-cooling of Au-rich Au—Sn—Lu and Sn-rich Ag—Sn—Lu solders produce $Au_4Lu$ and $Sn_3Lu$ islands, respectively. The super-cooling of a solder, whose reactive atoms are rare earth elements, produces a solder in which most reactive atoms are in such inter-metallic phase islands.

Since inter-metallic-phase islands are stable, the islands provide added protection against oxidation during use of oxidation-resistant reactive solders and brazes that are made from an inner layer 23 with such islands. The production of such inter-metallic-phase islands by the rapid solidification process is described in copending U.S. patent application No. 09/642216, which is incorporated by reference herein in its entirety.

In inner layers 23 made by the above-described rapid solidification process, the island sizes are kept small. For small island sizes, the grain sizes of the final reactive solders are often smaller than the grain sizes in compositionally equivalent solders not having the islands. The smaller grain sizes tend to improve strengths and fatigue resistances of such solders. The grain sizes must be kept small to achieve fast island dissolution and quick diffusion of reactive atoms during soldering. In exemplary inner layers 23, islands have diameters of less than 60 $\mu$ and preferably less than about 20 $\mu$ to about 10 $\mu$.

An alternate method of cold weld fabrication of oxidation-resistant reactive solders and brazes produces a solders and brazes with cylindrical cross sections. The method includes forming a composite by positioning a cylindrical jacket layer, which is free of reactive atoms, about a cylindrical inner layer. The inner and jacket layers have the same metallic matrix, but the inner layer also has reactive atoms dispersed therein. Exemplary inner layers are reactive solders or brazes, e.g., produced by the above-describe rapid solidification process. After being positioned, the concentric layers are cold welded together by swaging or wire drawing the composite to produce a cylindrical cross section solder or braze.

Some embodiments use the cylindrical solders and brazes produced by the above-described method as a preform. These embodiments roll-flatten the preform to a ribbon form. The surface regions of the final ribbon form are still free of reactive elements.

Figure 4:
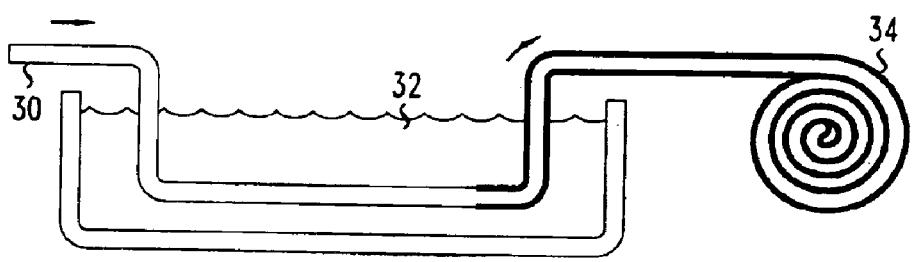
FIG. 4 illustrates a dip method for fabricating oxidation-resistant reactive solders and brazes.

FIG. 4 shows a dip method for fabricating oxidation-resistant reactive solders and brazes. The method includes providing a starting sheet or wire 30 of metallic matrix in which reactive atoms are already dispersed. The method includes dipping the starting sheet or wire 30 into a molten bath 32 of elemental-metal or alloy-metal. The bath is free of reactive elements. The method includes removing a coated sheet or wire 34 from the molten bath 32 after a selected immersion time. The temperature of bath 32 and immersion time control the thickness of the coating. The coated sheet or wire 34 is either the final oxidation-resistant reactive solder or braze or a preform that will be mechanically deformed to produce such a solder or braze.

In the method of FIG. 4, the metallic coating has a lower melting temperature than the metallic matrix of starting sheet or wire 30. Otherwise, the starting sheet or wire 30 will partially melt thereby causing reactive atoms to diffuse into the bath 32. Then, such reactive atoms would contaminate surface regions of later dipped portions of the sheet or wire 30.

In some embodiments, the starting sheet or wire 30 is a reactive solder or braze that is produced by the above-described rapid solidification process.

Figure 5:
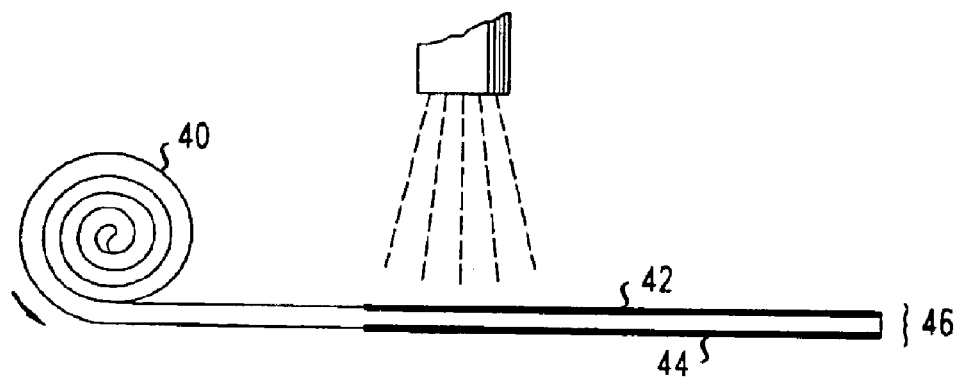
FIG. 5 illustrates a thin film deposition method for fabricating oxidation-resistant reactive solders and brazes.

FIG. 5 shows an alternate method for producing an oxidation-resistant reactive solder or braze. The method involves performing a thin film deposition to bond metallic jacket layers 42, 44 that are free of reactive elements to a starting metallic sheet 40. The starting metallic sheet 40 has reactive atoms dispersed therein. Thin film deposition processes include evaporation, sputtering, and chemical vapor deposition. Thin film depositions enable forming jacket layers 42, 44 with a variety of metallic compositions. The thin film deposition-based methods are able to make oxidation-resistant reactive solders and brazes in which interior and surface regions have different elemental-metal or alloy-metal compositions.

In some embodiments, the starting sheet 40 is a reactive solder or braze produced by the above-described rapid solidification process. For such starting sheets, the temperature is kept low during thin film deposition. Temperatures are kept below about 0.8 times the starting sheet's melting temperature (in degrees Kelvin) and preferably below 0.6 times the starting sheet's melting temperature to reduce temperature-induced coarsening of inter-metallic-phase islands.

Figure 6:
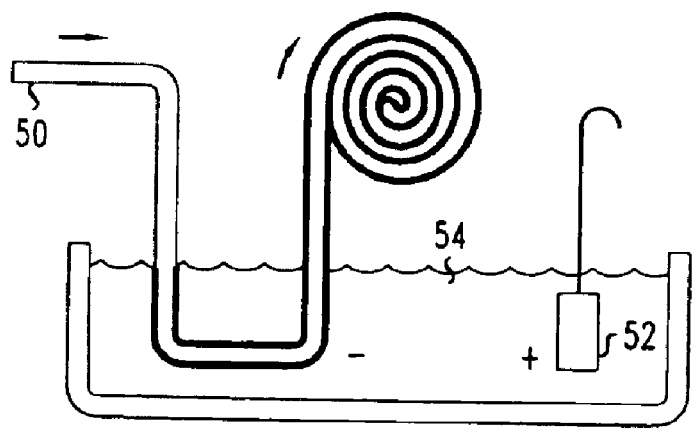
FIG. 6 illustrates an electroplating method for fabricating oxidation-resistant reactive solders and brazes.

FIG. 6 illustrates another method for producing an oxidation-resistant reactive solder or braze. The method includes setting up an electroplating cell 54. In the cell 54, a sheet of reactive solder or braze 50 functions as the cathode, and a chunk of jacketing material 52 functions as the anode. The chunk of jacketing material 52 is free of reactive elements.

The method involves applying a voltage across the cell. The voltage causes jacket material to migrate from the anode through the cell's electrolyte to the cathode. The migrating material electroplates the sheet of reactive solder or braze 50 with a coating of metallic material that is free of reactive elements.

The above-described methods can produce a variety of oxidation-resistant reactive solders and brazes with elemental-metal or alloy-metal matrices. Exemplary elemental metal matrices are tin (Sn), antimony (Sb), indium (In), bismuth (Bi), zinc (Zn), lead (Pb), silver (Ag), and gold (Au). Exemplary alloy-metal matrices include alloys of gold-tin (Au—Sn), lead-tin (Pb—Sn), bismuth-tin (Bi—Sn), tin-silver (Sn—Ag), tin-zinc (Sn—Zn), tin-antimony (Sn—Sb), copper-silver (Cu—Ag), cadmium-silver (Cd—Ag), copper-zinc-silver (Cu—Zn—Ag), silver-copper-zinc-nickel (Ag—Cu—Zn—Ni), and copper-tin-silver (Cu—Sn—Ag). Exemplary solders have alloy-metal matrices with approximate weight percent (wt.%) compositions of the following forms: Au-20 wt. % Sn eutectic (melting point (m.p.)=280° C.), Au-12.5 wt. % Ge eutectic (m.p.=361° C.), Au-3.2 wt. % Si eutectic (m.p.=363° C.), Au-25.5 wt. % Sb eutectic (m.p.=360° C.), Au-42 wt. % In (m.p.=495° C.), and Ag-3.5 wt. % Sn eutectic (m.p.=221° C.), Sn-37 wt. % Pb, Pb-5 wt. % Sn, Bi-48 wt. % Sn, Sn-5 wt. % Sb, Sn-45 wt. % In. Exemplary brazes have metallic matrices with approximate alloy compositions such as: Cu-50 wt. % Ag (m.p. 871° C.), Cu-37 wt. % Zn-5 wt. % Ag (m.p. 879° C.), Cd-5 wt. % Ag (m.p. 393° C.), Ag-30 wt. % Cu-28 wt. % Zn-2 wt. % Ni (m.p. 779° C.), Cu-8 wt. % Sn-7 wt. % Ag (m.p. 985° C.), and Ag-25 wt. % Cu-15 wt. % Zn (m.p. 718° C.).

Various ones of the solders and brazes have metallic matrices that include 0.2–5.0 wt. % Au and/or Ag. These small weight percentages of Au and/or Ag increase solid solubilities of rare earths, i.e., the reactive atoms, in the metallic matrices. The Au and/or Ag also tend to protect the reactive atoms against oxidation, because oxygen is less soluble in solders and brazes having small weight percents of Au and/or Ag. The Au and/or Ag also tends to accelerate dissolution of rare earth elements when these metallic matrices melt thereby aids rare earth atoms to diffuse to interfaces and aid in bonding of such solders and brazes to substrates.

Oxidation-resistant reactive solders and brazes that are fabricated by above-described methods incorporate a variety of species of reactive elements therein. Some of these reactive solders and brazes incorporate one or more of the following reactive elements: titanium (Ti), zirconium (Zr), hafnium (Hf), scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

Reactive elements typically have low concentrations in metallic matrices of the solders and brazes produced by the above-described methods. In interior regions of such solders and brazes, exemplary total weight percents of reactive elements are in the range of about 0.1 wt. % to 5 wt. %, and preferably in the range of about 0.2–2 wt. %. The selected concentrations for reactive elements depend on the desired reactivities at solder-to-substrate or braze-to-substrate interfaces, size of islands of reactive atoms in metallic matrices, and solubility of the reactive atoms in the metallic matrices.

The above-described methods produce oxidation-resistant reactive solders and brazes that directly bond to a variety of substrates without intermediate metallization layers. These exemplary substrates includes ceramics. The ceramics include oxides such as $SiO_2$, $Al_2O_3$, NiO, $Cr_2O_3$, $TiO_2$, $NbO_2$, $Fe_2O_3$, $Ta_2O_5$, $ZrO_2$, CuO, and ZnO; carbides such as SiC, TiC and TaC; nitrides such as TiN, TaN, $Si_3N_4$, and AlN; and fluorides such as $CaF_2$, $MgF_2$. Other exemplary substrates include metals with native oxides such as Al, Si, Ti, Cr, Zr, Zn, and alloys of such metals. Other exemplary substrates include semiconductors such as Si, GaAs, and GaN; optical materials such as $LiNbO_3$, ZnS, ZnSe, YAG; and jewelry materials such as diamond, sapphire, topaz, and platinum.

Bonding oxidation-resistant reactive solders and brazes produced by the above-described methods proceeds by techniques for conventional reactive solders or brazes. Flux and ultrasonic treatments are not usually needed, but such treatments can further reduce risks of forming oxide skins on the molten solders or brazes.

Other embodiments will be apparent to those of skill in the art from the detailed description, figures, and claims herein.

What is claimed is:

1. A method for fabricating a reactive solder or braze, comprising:

forming a metallic matrix with an interior region and surface regions by actively providing a higher concentration of reactive atoms to the interior region than to the surface regions.

2. The method of claim 1, wherein the providing comprises:
implanting ions of the reactive atoms through a front surface of the metallic matrix to form a buried layer of reactive atoms in the interior region.

3. The method of claim 1, wherein the reactive atoms include one of IIIB elements, IVB elements, and rare earth elements.

4. The method of claim 1, wherein the providing further comprises:
implanting ions of the reactive atoms through a back surface of the metallic matrix to form a second buried layer of reactive atoms in the interior region.

5. The method of claim 4, wherein the implanting through the front and back surfaces produces different species of reactive atoms in the two layers.

6. The method of claim 1, wherein the providing further comprises:
making the interior region from a solid metallic composition that has reactive atoms dispersed therein; and
wherein the forming further comprises bonding the surface region to an exterior of the solid metallic composition.

7. The method of claim 6, wherein the bonding comprises:
placing a layer of metal adjacent to a surface of the solid metallic composition; and
applying a pressure that fuses the layer to the surface of the solid metallic composition.

8. The method of claim 6, wherein the bonding comprises coating a portion of the surface of the solid metallic composition with a layer of metal.

9. The method of claim 8, wherein the coating comprises performing a thin film deposition of the metal on the surface of the solid metallic composition.

10. The method of claim 8, wherein the coating comprises placing a portion of the surface of the solid metallic composition in a liquid comprising the metal in molten form.

11. The method of claim 8, wherein the coating comprises electroplating the metal on the surface of the solid metallic composition.

12. The method of claim 6, wherein the reactive atoms include one of IIIB elements, IVB elements, and rare earth elements.

13. A solder or braze composition, comprising:
a metallic matrix having first and second surface regions and first and second interior regions, the first and second interior regions being adjacent the respective first and second surface regions, the interior regions having higher concentrations of reactive atoms than the surface regions, the first and second interior regions having different species of reactive atoms dispersed therein.

14. The composition of claim 13, wherein the reactive atoms are absent in the surface regions.

15. The composition of claim 13, wherein the reactive atoms are selected from a group consisting of group IIIB elements, group IVB elements, and rare earth elements.

16. The composition of claim 13, wherein the surface and interior regions of the metallic matrix comprise different metals.

17. A solder or braze composition, comprising:
a first matrix material of one metal; and
a second matrix material of a different metal being bonded to the first matrix material, the first matrix material being located inside the second matrix material and having a higher concentration of reactive atoms than the second matrix material.

18. The composition of claim 17, wherein the reactive atoms are absent from the second matrix material.

19. The composition of claim 18, wherein the reactive atoms are selected from a group consisting of group IIB elements, group IVB elements, and rare earth elements.

* * * * *